US010888206B2

(12) United States Patent
Moeller

(10) Patent No.: US 10,888,206 B2
(45) Date of Patent: Jan. 12, 2021

(54) VACUUM CLEANER WITH DISPOSABLE DIRT COLLECTOR

(71) Applicant: MILWAUKEE ELECTRIC TOOL CORPORATION, Brookfield, WI (US)

(72) Inventor: Scott T. Moeller, Richfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 185 days.

(21) Appl. No.: 15/998,777

(22) Filed: Aug. 16, 2018

(65) Prior Publication Data
US 2019/0053681 A1    Feb. 21, 2019

Related U.S. Application Data

(60) Provisional application No. 62/546,109, filed on Aug. 16, 2017.

(51) Int. Cl.
*A47L 9/14*        (2006.01)
*A47L 9/28*        (2006.01)
*B01D 46/10*       (2006.01)

(52) U.S. Cl.
CPC .......... *A47L 9/1436* (2013.01); *A47L 9/1409* (2013.01); *A47L 9/1445* (2013.01); *A47L 9/1454* (2013.01); *A47L 9/1463* (2013.01); *A47L 9/2884* (2013.01); *B01D 46/10* (2013.01); *B01D 2279/55* (2013.01)

(58) Field of Classification Search
CPC .... A47L 9/1409; A47L 9/1436; A47L 9/1445; A47L 9/1454; A47L 9/1463; A47L 9/2884; B01D 2279/55; B01D 46/10
See application file for complete search history.

(56) References Cited

U.S. PATENT DOCUMENTS

| | | | | |
|---|---|---|---|---|
| 2,025,946 A | * | 12/1935 | Wenner-Gren | A47L 5/365 55/319 |
| 2,250,226 A | * | 7/1941 | Juelson | A47L 9/185 96/310 |
| D189,743 S | * | 2/1961 | Happe | D32/23 |
| 3,961,924 A | * | 6/1976 | Alskog | B01D 46/523 55/500 |
| D260,151 S | * | 8/1981 | Martinec | D32/31 |

(Continued)

FOREIGN PATENT DOCUMENTS

WO         95/16383        6/1995

*Primary Examiner* — Marc Carlson
(74) *Attorney, Agent, or Firm* — Michael Best & Friedrich LLP

(57) ABSTRACT

A vacuum cleaner includes a power head, a dirt collector, and an attachment plate. The power head includes an inlet, an outlet, and a suction source. The suction source is operable to draw air in through the inlet. The dirt collector includes a first wall that at least partially defines an internal volume. The first wall includes an opening that communicates between the internal volume and an external environment. The attachment plate removably couples the power head to the dirt collector. The attachment plate is coupled to the first wall of the dirt collector adjacent the opening and between the suction source and the dirt collector. The attachment plate includes an inlet opening and an outlet opening. The inlet opening and the outlet opening communicate between the internal volume and the external environment. The dirt collector is configured to be discarded.

20 Claims, 5 Drawing Sheets

(56) References Cited

U.S. PATENT DOCUMENTS

| | | | | |
|---|---|---|---|---|
| 5,192,344 A * | 3/1993 | House | A47L 9/181 | 96/247 |
| 5,428,865 A * | 7/1995 | Yarbrough | A47L 9/182 | 15/353 |
| 5,525,396 A * | 6/1996 | Rudolph | A47L 9/102 | 428/131 |
| D372,348 S * | 7/1996 | Rudolph | D32/31 | |
| 5,858,072 A * | 1/1999 | Motoda | B01D 47/16 | 55/342 |
| 5,871,562 A * | 2/1999 | Culoso | A61L 9/122 | 95/256 |
| 6,027,541 A * | 2/2000 | Siemers | B01D 45/16 | 55/429 |
| D423,354 S * | 4/2000 | Lin | D32/31 | |
| 6,083,307 A * | 7/2000 | Dular | B01D 47/021 | 15/353 |
| 6,210,457 B1 * | 4/2001 | Siemers | B01D 45/16 | 55/429 |
| 6,616,733 B1 * | 9/2003 | Pellegrin | B01D 47/04 | 95/150 |
| D495,347 S * | 8/2004 | Erbach | D15/138 | |
| D599,064 S * | 8/2009 | Crevling, Jr. | D32/31 | |
| 8,337,580 B2 * | 12/2012 | Manska | A47L 7/0071 | 55/337 |
| 8,997,308 B2 * | 4/2015 | Cortes Ruiz | A47L 7/0004 | 15/327.6 |
| 2004/0031111 A1 * | 2/2004 | Porchia | G06Q 30/0643 | 15/52.1 |
| 2005/0257340 A1 * | 11/2005 | Parrott | A47L 7/0042 | 15/353 |
| 2012/0151705 A1 * | 6/2012 | Herndon | B01D 46/02 | 15/246.2 |
| 2012/0311811 A1 * | 12/2012 | Hollis | A47L 9/181 | 15/327.1 |
| 2014/0373306 A1 * | 12/2014 | Tomasiak | A47L 5/365 | 15/347 |
| 2018/0078104 A1 * | 3/2018 | Register | A47L 9/127 | |

* cited by examiner

VACUUM CLEANER WITH DISPOSABLE DIRT COLLECTOR

CROSS-REFERENCE TO RELATED APPLICATION

This application claims priority to U.S. Provisional Application No. 62/546,109 filed Aug. 16, 2017, the entire contents of which are incorporated herein by reference.

BACKGROUND

The present invention relates to vacuum cleaners.

Vacuum cleaners typically include a suction source, suction nozzle, and a dirt collector. Debris is drawn through the suction nozzle by the suction source and the debris is collected in the dirt collector. When the dirt collector is full, the user empties the dirt collector.

SUMMARY

In one aspect, a vacuum cleaner includes a power head, a dirt collector, and an attachment plate. The power head includes an inlet, an outlet, and a suction source. The suction source is operable to draw air in through the inlet. The dirt collector includes a first wall that at least partially defines an internal volume. The first wall includes an opening that communicates between the internal volume and an external environment. The attachment plate removably couples the power head to the dirt collector. The attachment plate is coupled to the first wall of the dirt collector adjacent the opening and between the suction source and the dirt collector. The attachment plate includes an inlet opening and an outlet opening. The inlet opening and the outlet opening communicate between the internal volume and the external environment. The dirt collector is configured to be discarded.

In another aspect, a disposable dirt collector for a vacuum cleaner includes walls that define an internal volume. A first opening and a second opening are present on a first wall of the walls. The openings communicate between the internal environment and an external environment. The disposable dirt collector also includes a plate coupled to the first wall proximate to the openings. The plate includes an inlet opening and an outlet opening. The inlet opening communicates between the internal volume and the external environment through the first opening. The outlet opening that communicates between the internal volume and the external environment through the second opening. The plate also includes an attachment member that is configured to removably couple a suction source to the dirt collector.

Other aspects of the disclosure will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
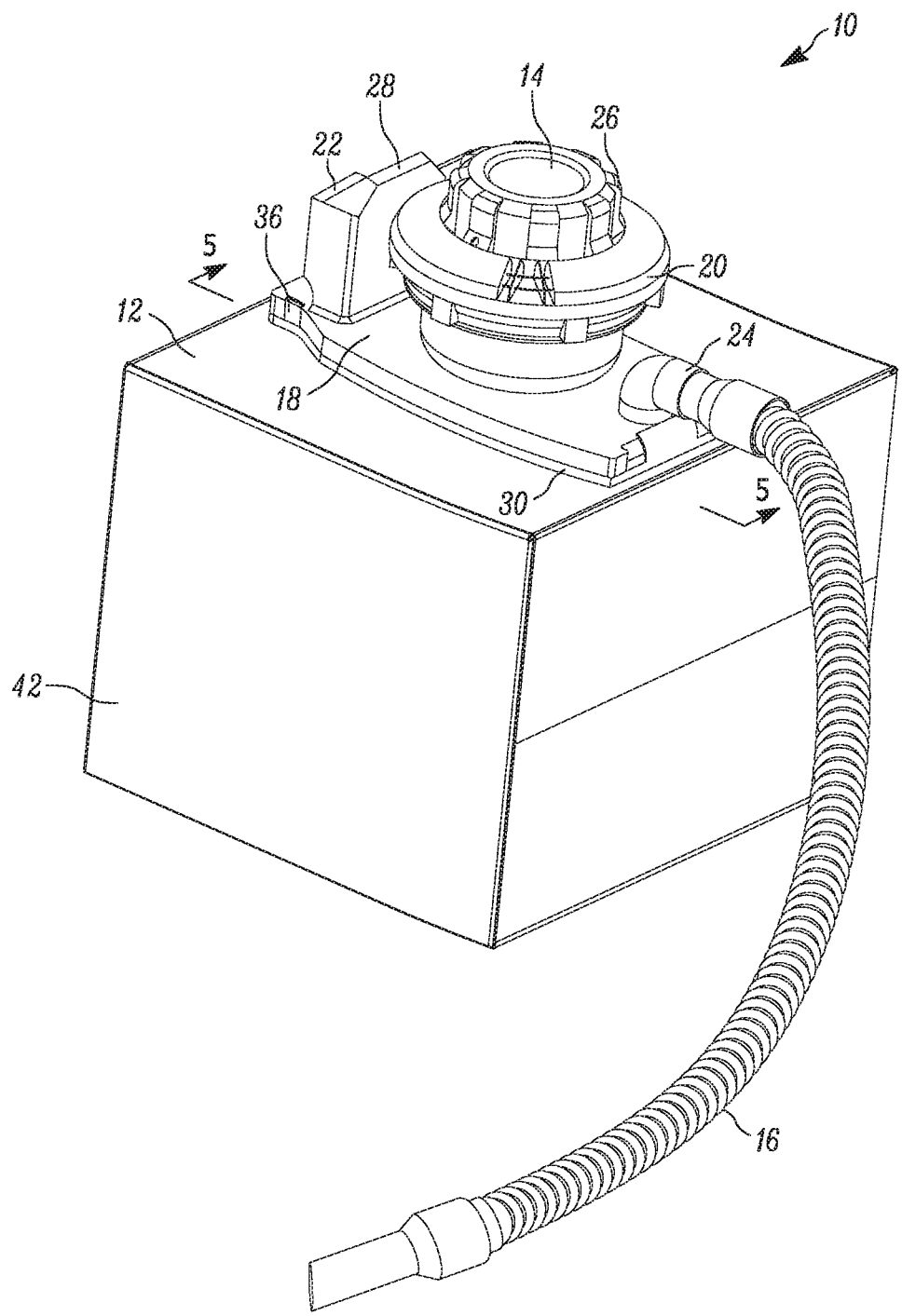
FIG. 1 is a perspective view of a vacuum cleaner including a disposable dirt collector according to one embodiment.
Figure 2:
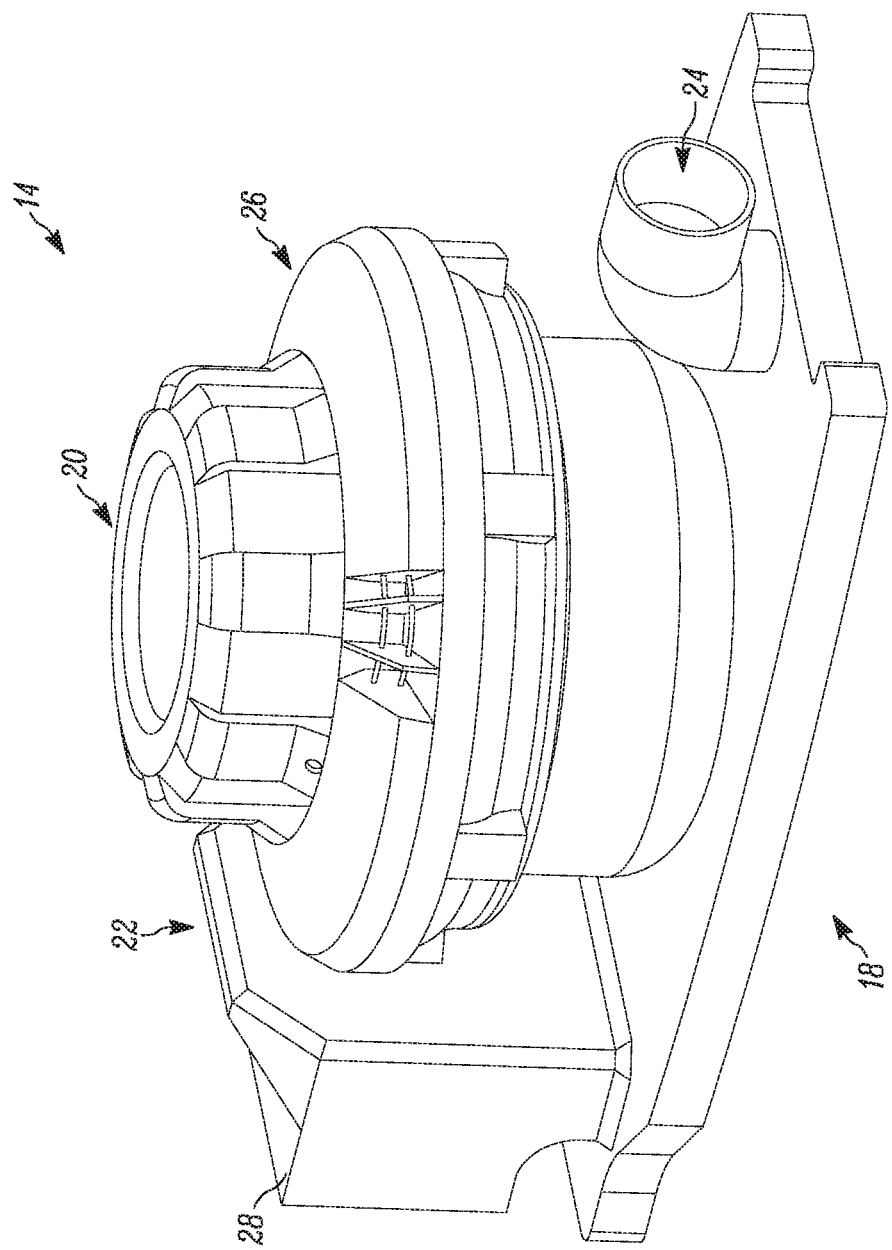
FIG. 2 is a perspective view of the vacuum cleaner of FIG. 1 with a suction hose removed and the disposable dirt collector removed.

FIG. 1 illustrates a vacuum cleaner 10 that includes a disposable dirt collector 12. The dirt collector 12 is disposable or is thrown away when the dirt collector 12 is full or when the user is done using the vacuum cleaner 10. The dirt collector 12 is formed from a relatively low cost item, such as a cardboard box. The vacuum cleaner 10 includes a power head 14, a suction conduit 16, and the dirt collector 12.

The power head 14 includes a base 18. The power head 14 further includes a suction source 20, a power source and controller 22, and an inlet 24 all attached to the base 18. The suction source 20 includes a motor and impeller or fan. The motor is operable to rotate the impeller to generate a suction airflow through the inlet 24 and the suction conduit 16 to draw air and debris into the collector 12. Exhaust openings 26 are adjacent the suction source 20 to allow clean air to exhaust from suction source 20. The power source and controller 22 includes a battery 28 for powering and controlling the suction source 20. In other embodiments, the power source and controller 22 can include a power cord that is received in an outlet to power the suction source.

Figure 3:
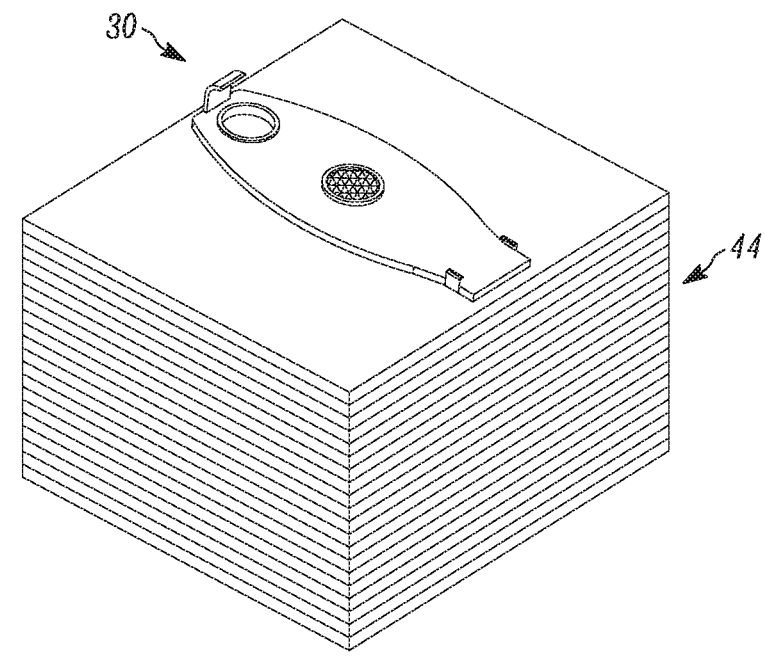
FIG. 3 is a perspective view of the disposable dirt collector with an attachment plate of the vacuum cleaner attached to the dirt collector.
Figure 3:
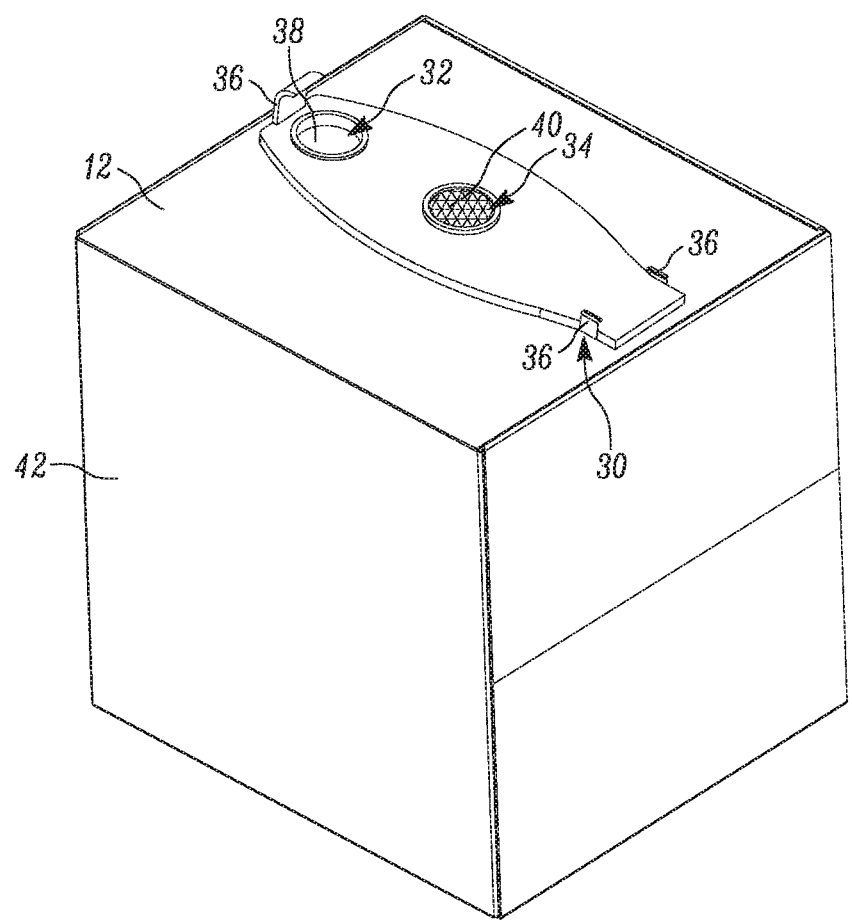

The vacuum cleaner 10 further includes an attachment plate 30 that attaches the power head 14 to the dirt collector 12. Referring to FIG. 3, the attachment plate 30 includes an inlet opening 32, an outlet opening 34, and attachment members 36. In the illustrated embodiment, the attachment members 36 are tabs. In other embodiments, the attachment members 36 may be fasteners, latches, clips, or any other similar feature. A one-way valve 38 is located in the inlet opening 32 to allow suction air flow to travel into an internal volume of the dirt collector 12 but prevent debris from traveling out of the dirt collector 12 when the power head 14 is removed from the dirt collector 12. In one embodiment, the power head 14 includes a projection 50 (FIG. 5) that extends through the valve 38 when the power head 14 is attached to the plate 30, which holds the valve 38 open. Then, when the power head 14 is removed from the attachment plate 30, the valve 38 automatically closes. The inlet opening 32 is adjacent the inlet 24 of the power head 14 when the power head 14 is attached to the attachment plate 30. A filter 40 is located in the outlet opening 34. The filter 40 filters the suction airflow exiting the dirt collector 12 before the airflow travels through the suction source 20 and is exhausted to atmosphere. In the illustrated embodiment, the tabs 36 latch onto the power head 14 in order to removably attach the power head 14 to the attachment plate 30. In other embodiments, the tabs 36 are receivable within apertures of power head 14. Gaskets or the like may be located adjacent and around the openings 32, 34 and between the power head 14 and the attachment plate 30.

Figure 5:
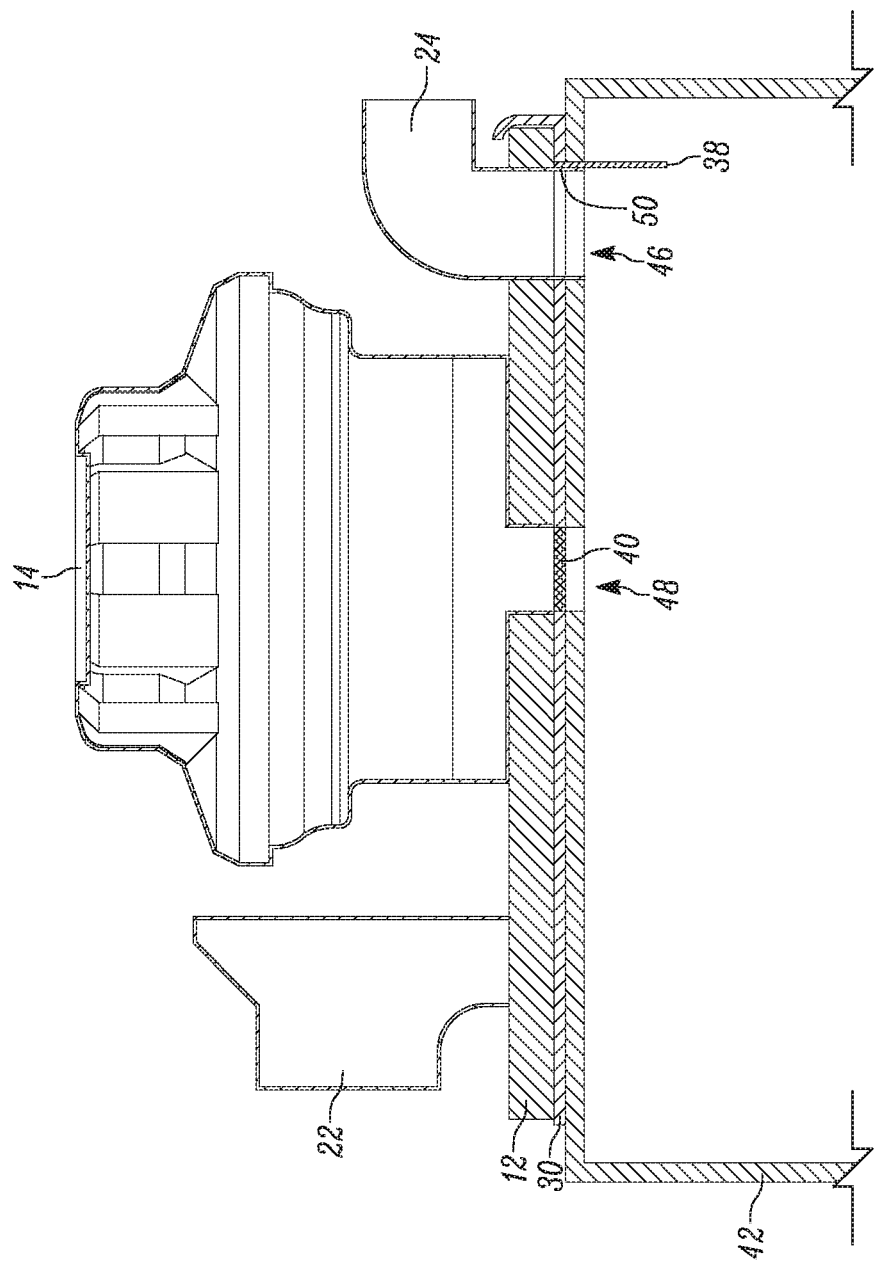
FIG. 5 is a cross-sectional view of the vacuum cleaner of FIG. 1, viewed along line 5-5.

In one method of operation, referring to FIG. 3, the user creates a cardboard box 42 from a stack 44 of flat boxes. Although the term "box" is used to describe the collector 12 and the illustrated collector 12 is cube shaped, it should be understood that the collector 12 can have other shapes, such as cylindrical. Also, while the illustrated box 42 is generally a cuboid with six faces or walls all of the same size, in other embodiments; the box may be a rectangular cuboid with faces having the same or different sizes. The faces of the box 12 define the internal volume of the dirt collector 12. In some embodiments, as shown in FIG. 5, one the faces includes a first aperture 46 and a second aperture 48 adjacent the attachment plate 30 to provide fluid communication through the inlet and outlet openings 32, 34 respectively to the internal volume of the dirt collector 12. In other embodiments, one of the faces includes a single aperture (not shown) which provides fluid communication through both the inlet and outlet openings 32, 34. One aperture is adjacent to the inlet opening 32 and the other aperture is adjacent to the outlet opening 34. Furthermore, although the illustrated collector 12 is made from cardboard, other types of material may be utilized, including plastic or other suitable materials. The material utilized for the dirt collector 12 is ideally impermeable to air.

Figure 4:
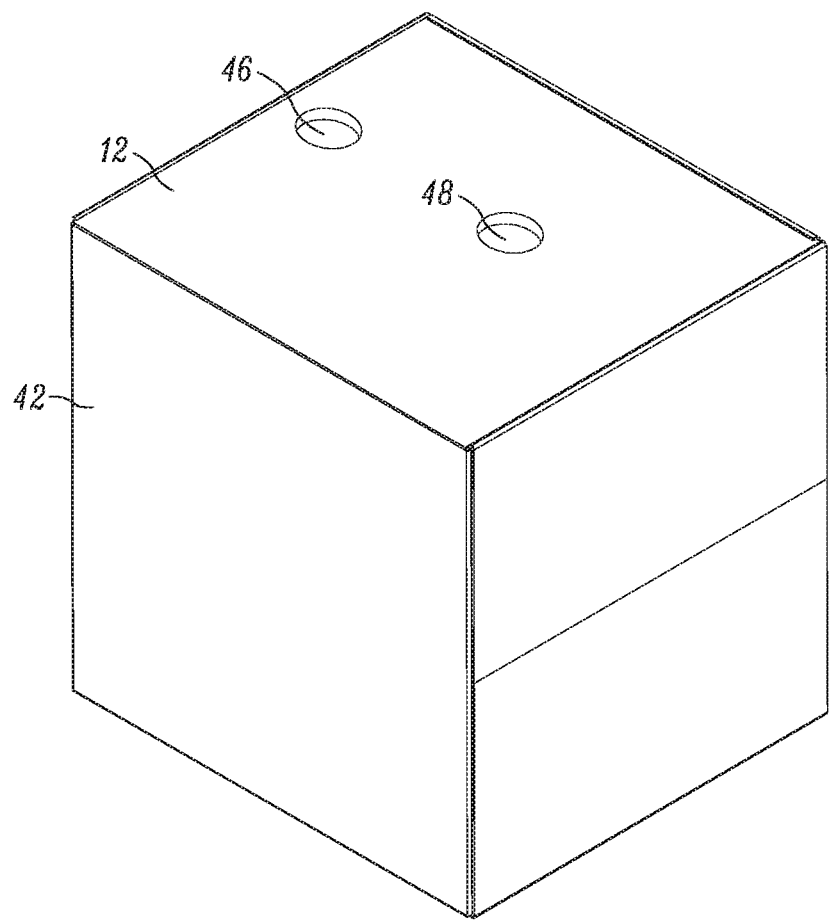
FIG. 4 is a perspective view of the disposable dirt collector with the attachment plate of the vacuum cleaner unattached.

In the illustrated embodiment the boxes 42 of the stack 44 are supplied to the user with the attachment plate 30 pre-attached to the box 42. In this embodiment, the plate 30 is not meant to be reused and the user disposes of the box 42 and plate 30 together when the user is finished vacuuming. In another embodiment, the plate 30 is re-used and attached to the box 42 by the user and the plate 30 detached from the box 42 when the box 42 is full. In such an embodiment, as shown in FIG. 4, the apertures 46, 48 are created in the box 42 for the inlet and outlet openings 32, 34 of the attachment plate 30. Then, the user attaches the attachment plate 30 to the box 32 as shown in FIG. 3 with the inlet opening 32, 34 aligned with the apertures created by the user through the box 42.

The power head 14 is attached to the attachment plate 30 as shown in FIG. 1. The vacuum 10 can then be used to draw debris through the suction conduit 16 and into the dirt collector 12 that is created by the box 42. Debris is collected in the box 42 and relatively clean air exhausts through the filter 40, through the suction source 20 and eventually through the exhaust openings 26. The impermeability of the dirt collector 12 prevents air of suctioned debris from traversing the box 42 except through the inlet opening 32 or the outlet opening 34. When the box 42 is full of debris or the job is completed, the user can simply remove the power head 14 from the box 42 and dispose of or throw away the dirt collector 12, in this embodiment, the box 42.

What is claimed is:

1. A vacuum cleaner comprising:
a power head including an inlet, an outlet, and a suction source operable to draw air in through the inlet;
a dirt collector including a first wall at least partially defining an internal volume, the first wall including an opening communicating between the internal volume and an external environment; and
an attachment plate that removably couples the power head to the dirt collector, the attachment plate coupled to the first wall of the dirt collector adjacent the opening and between the suction source and the dirt collector, the attachment plate including an inlet opening and an outlet opening, the inlet opening and the outlet opening communicating between the internal volume and the external environment, and the dirt collector is configured to be discarded,
wherein the attachment plate is fixed to the dirt collector and is configured to be discarded with the dirt collector.

2. The vacuum cleaner of claim 1, wherein the dirt collector is impermeable to air.

3. The vacuum cleaner of claim 2, wherein the dirt collector includes a cardboard box.

4. The vacuum cleaner of claim 1, further comprising a battery pack electrically connected to the suction source, the battery pack selectively providing electrical current to the suction source.

5. The vacuum cleaner of claim 1, wherein the attachment plate further includes a filter located within the outlet, the filter filters suctioned air leaving the dirt collector and traveling to the suction source.

6. The vacuum cleaner of claim 1, wherein at least one of the attachment plate and the suction source includes an attachment member that releasably couples the attachment plate and the suction source.

7. The vacuum cleaner of claim 6, wherein the attachment plate includes the attachment member, the attachment member includes a tab.

8. The vacuum cleaner of claim 1, wherein the dirt collector is a rectangular cuboid.

9. The vacuum cleaner of claim 1, wherein the opening of the dirt collector is a first opening, wherein the first wall further includes a second opening communicating between the internal volume and an external environment, the inlet of the power head communicating between the internal volume and the external environment through the first opening and the outlet communicating between the internal volume and the external environment through the second opening.

10. A vacuum cleaner comprising:
a power head including an inlet, an outlet, and a suction source operable to draw air in through the inlet;
a dirt collector including a first wall at least partially defining an internal volume, the first wall including an opening communicating between the internal volume and an external environment; and
an attachment plate that removably couples the power head to the dirt collector, the attachment plate coupled to the first wall of the dirt collector adjacent the opening and between the suction source and the dirt collector, the attachment plate including an inlet opening and an outlet opening, the inlet opening and the outlet opening communicating between the internal volume and the external environment, and the dirt collector is configured to be discarded, wherein the opening of the dirt collector is a first opening, wherein the first wall further includes a second opening communicating between the internal volume and an external environment, the inlet of the power head communicating between the internal volume and the external environment through the first opening and the outlet communicating between the internal volume and the external environment through the second opening.

11. A vacuum cleaner comprising:
a power head including an inlet, an outlet, and a suction source operable to draw air in through the inlet;
a dirt collector including a first wall at least partially defining an internal volume, the first wall including an opening communicating between the internal volume and an external environment;
an attachment plate that removably couples the power head to the dirt collector, the attachment plate coupled to the first wall of the dirt collector adjacent the opening and between the suction source and the dirt collector, the attachment plate including an inlet opening and an outlet opening, the inlet opening and the outlet opening communicating between the internal volume and the external environment, and the dirt collector is configured to be discarded;
a one-way valve positioned within the inlet to prevent debris within the internal volume from escaping through the inlet; and
a projection coupled to the suction source, the projection extending through the inlet and opening the valve while the suction source is coupled to the attachment plate.

12. A disposable dirt collector for a vacuum cleaner comprising:
walls defining an internal volume;
a first opening and a second opening, the first and second openings on a first wall of the walls, the openings communicating between the internal volume and an external environment; and
a plate coupled to the first wall proximate the openings, the plate including an inlet opening communicating between the internal volume and the external environment through the first opening and an outlet opening communicating between the internal volume and the external environment through the second opening, the plate including an attachment member configured to removably couple a suction source to the dirt collector.

13. The disposable dirt collector of claim 12, wherein the plate is fixed to the dirt collector and is disposable with the dirt collector.

14. The disposable dirt collector of claim 12, wherein the walls are made from cardboard.

15. The disposable dirt collector of claim 12, further comprising a one-way valve positioned within the inlet opening, the one-way valve configured to prevent debris from exiting the internal volume through the inlet opening, the suction source configured to open the one-way valve while coupled to the plate.

16. The disposable dirt collector of claim 12, further comprising a filter positioned within the outlet opening, the filter configured to filter debris from air leaving the internal volume.

17. The disposable dirt collector of claim 12, wherein attachment member includes a tab configured to releasably couple the suction source to the plate.

18. The disposable dirt collector of claim 12, further comprising a first gasket positioned adjacent the inlet opening and a second gasket positioned adjacent the outlet opening.

19. The disposable dirt collector of claim 12, wherein the plate is removably coupled to the first wall and is reusable.

20. The disposable dirt collector of claim 12, wherein the walls are impermeable to air.

* * * * *